US008160052B2

(12) United States Patent
E et al.

(10) Patent No.: US 8,160,052 B2
(45) Date of Patent: Apr. 17, 2012

(54) METHOD, SYSTEM AND APPARATUS FOR SYNCHRONIZING STREAM BETWEEN BEARER CONTROL LAYER AND BEARER LAYER DEVICES

(75) Inventors: Wei E, Shenzhen (CN); Rui Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1029 days.

(21) Appl. No.: 12/108,268

(22) Filed: Apr. 23, 2008

(65) Prior Publication Data

US 2008/0232346 A1    Sep. 25, 2008

Related U.S. Application Data

(63) Continuation of application No. PCT/CN2006/002541, filed on Sep. 27, 2006.

(30) Foreign Application Priority Data

Oct. 24, 2005  (CN) .......................... 2005 1 0114397

(51) Int. Cl.
*H04J 3/06*  (2006.01)

(52) U.S. Cl. ........ 370/350; 370/351; 370/352; 370/401; 370/392

(58) Field of Classification Search .................. 370/351, 370/352, 401, 392; 709/226, 239–242
See application file for complete search history.

(56) References Cited

U.S. PATENT DOCUMENTS

| | | | |
|---|---|---|---|
| 5,680,396 A * | 10/1997 | Moritomo et al. | 370/392 |
| 6,295,540 B1 * | 9/2001 | Sanschagrin et al. | 1/1 |
| 6,829,655 B1 | 12/2004 | Huang et al. | |
| 7,319,691 B2 | 1/2008 | Qing et al. | |
| 7,746,843 B2 * | 6/2010 | Chen et al. | 370/351 |
| 2002/0036983 A1 | 3/2002 | Widegren et al. | |
| 2003/0235212 A1 | 12/2003 | Kuo | |
| 2006/0068780 A1 * | 3/2006 | Dalsgaard et al. | 455/432.3 |
| 2006/0251045 A1 | 11/2006 | Okubo | |
| 2007/0053363 A1 | 3/2007 | Chen et al. | |

FOREIGN PATENT DOCUMENTS

| | | |
|---|---|---|
| CN | 1523834 A | 8/2004 |
| CN | 1581791 A | 2/2005 |
| CN | 1599325 A | 3/2005 |

(Continued)

OTHER PUBLICATIONS

Yavatkar, et al. XP-002179102, "Aframework for policy-based Admission Control", The Internet Society (2000).*

(Continued)

*Primary Examiner* — Hassan Kizou
*Assistant Examiner* — Siming Liu
(74) *Attorney, Agent, or Firm* — Leydig, Voit & Mayer, Ltd.

(57) ABSTRACT

A method, a system and an apparatus for synchronizing the stream between the bearer control layer and bearer layer devices. Bearer layer device returns information corresponding to the stream synchronizing information distributed by the resource manager RM of the bearer control layer back to the resource manager RM (101, 102); when the resource manager RM determines that there is information needed to be synchronized included in the information returned by bearer layer device (103), it compares the information with the one held by itself (105), and performs synchronization to the information within the bearer layer devices that need to be synchronized according to the result of the comparison.

11 Claims, 2 Drawing Sheets

FOREIGN PATENT DOCUMENTS

| | | |
|---|---|---|
| WO | WO 2004/105418 A1 | 12/2004 |
| WO | WO2005/013553 * | 2/2005 |

OTHER PUBLICATIONS

Extended European Search Report from the European Patent Office in corresponding European Patent Application No. 06791130.5 (Aug. 5, 2010).

"3GPP TS 23.203-Policy and Charging Control Architecture (Release 7)," Oct. 2005, V0.1.1, 3$^{rd}$ Generation Partnership Project, Valbonne, France.

Written Opinion from the International Searching Authority in corresponding PCT Patent Application No. PCT/CN2006/002541 (Feb. 8, 2007).

Durham, D., et al., "The COPS (Common Open Policy Service) Protocol," Jan. 2000, The Internet Society, Geneva, Switzerland.

Office Action in corresponding European Application No. 06 791 130.5 (Feb. 10, 2011).

Yakatkar et al., "A Framework for Policy-Based Admission Control," Jan. 2000, The Internet Society, Reston, Virginia.

2$^{nd}$ Office Action in corresponding European Application No. 06791130.5 (Jun. 16, 2011).

* cited by examiner

METHOD, SYSTEM AND APPARATUS FOR SYNCHRONIZING STREAM BETWEEN BEARER CONTROL LAYER AND BEARER LAYER DEVICES

CROSS-REFERENCE TO RELATED APPLICATIONS

This application is a continuation of International Application No. PCT/CN2006/002541, filed on Sep. 27, 2006, which claims priority to Chinese Application No. 200510114397.8, filed Oct. 24, 2005, the content of both of which is hereby incorporated by reference in their entirety.

FIELD OF THE INVENTION

The present invention relates to communication field and in particular to a method and system for synchronizing a stream between devices of a bearer control layer and a bearer layer, and a resource manager and bearer layer device.

BACKGROUND OF THE INVENTION

In IP telecom network (IPTN) technologies, effective management and reasonable use of IP network resources enable an IP network to bear a service satisfying a telecom operation demand. For example, a Resource Manager (RM) of a bearer control layer sends a Quality of Service (QoS) control command to an Edge Router (ER) of a bearer layer to perform tasks of stream classification, and label stack pushing.

A typical application model of the existing IPTN technologies is illustrated in FIG. 1. In FIG. 1, upon a call from a user, a call proxy sends a request for a required QoS resource to an RM, the RM selects a link and sends a stream setup message to an ER, and the ER sets up a stream successfully, resulting in a success of the call from the user. Upon the user hangs up, the call proxy instructs the RM to release the QoS resource, and the RM instructs the ER to delete corresponding information.

A QoS control command sent from the RM may be referred as a stream. The RM sends a stream to the ER or deletes a stream on the ER in response to a service control demand, and the ER adds or deletes a stream record on the ER by processing a command from the RM. Thus, a deviation may readily occur between stream records of the RM and the ER. In order to ensure normal operation of a service, stream records of the RM and stream records of the ER need to be kept in consistency and the stream record is subject to the stream records in the RM. However, stream table entries of the RM and ER may be inconsistent because a resource cannot be released after a stream becomes invalid at either of them due to abnormal communication between them or other reasons, so that the resource may be hung. If the resource hanging fails to be corrected timely, the RM may not receive any proper response from the ER to a sent stream and the ER may not release invalid resource. Accumulation of table entries inconsistencies between the RM and the ER may affect normal use of the IP bearer service.

In order to ensure consistency between stream records of the RM and the ER, stream table entries of the RM and the ER are checked for consistency and then deleting by the RM all streams on the ER at an appropriate time and resending a stream record to the ER so as to ensure consistency between the stream records of the RM and the stream records of the ER. The above check can be initiated periodically or by the RM on its own initiative.

This approach art has the following drawback.

When the RM deletes all streams on the ER at an appropriate time, services carried in the streams may be interrupted, and in order to avoid the service interruption, the deletion operation in this method can be executed only at a time when a relatively small number of services are present.

A second approach includes third party queries about a stream table entry of the ER and instructs the RM to delete an unwanted stream so as to ensure consistency between the stream records of the RM and the stream records of the ER.

This second approach has the following drawbacks.

An additional interface has to be added on the RM and the ER, which may complicate the operations of keeping stream consistency. This technical solution may not be applicable in a large scale application of services and also has the drawbacks of being error-prone, and inefficient.

SUMMARY OF THE INVENTION

An object of the invention is to provide a method and system for synchronizing a stream between devices of a bearer control layer and a bearer layer. With the technical solutions of the invention, consistency between stream records of an RM and a bear device can be ensured without any service interruption and without any temporal restriction on the time for stream synchronization operations. In the invention, no additional interface on the RM and the bear device is required, and thus operations of keeping consistency between stream records are made simple and easy to be extended.

The object of the invention is achieved with the following technical solutions.

One embodiment of the invention provides a method for synchronizing a stream between devices of a bearer control layer and a bearer layer, including:

returning, by a bearer layer device, a corresponding stream record to a resource manager RM on a bearer control layer in response to stream synchronization information sent from the resource manager RM; and comparing, by the resource manager RM, a stream record stored in the resource manager RM with the stream record returned from the bearer device, and performing a stream synchronization process on to-be-synchronized information in the bearer layer device in accordance with a comparison result.

The following technical solutions of the method are optional.

The process of returning by the bear device the stream information to the RM includes:

sending, by the resource manager RM, the stream synchronization information in a stream synchronization request message to the bearer layer device; and returning, by the bearer layer device, the corresponding stream record to the resource manager RM in response to the stream synchronization information.

The process of returning by the bear device the stream information to the RM includes:

sending, by the resource manager RM, to the bearer layer device the stream synchronization information in a stream synchronization request message carrying flag information of a stream to be synchronized; and checking, by the bear device, to determine whether a stream carrying the flag information is present, and if there is no stream carrying the flag information, returning an end message to the resource manager RM; if a stream carrying the flag information is present, selecting and returning the stream record carrying the flag information to the resource manager RM.

The process of returning by the bear device the stream information to the RM includes:

sending, by the resource manager RM, to the bearer layer device a policy dispatch message carrying the information to be stream synchronized; and returning, by the bearer layer device, the corresponding stream record to the resource manager RM in response to the stream synchronization information.

The process of returning by the bear device the stream information to the RM includes:

sending, by the resource manager RM, to the bearer layer device a policy dispatch message carrying the information to be stream synchronized, the information to be stream synchronized carrying flag information of a stream to be synchronized; and checking, by the bearer layer device, to determine whether a stream carrying the flag information is present, and if there is no stream carrying the flag information, returning an end message to the resource manager RM; if a stream carrying the flag information is present, selecting and returning the stream record carrying the flag information to the resource manager RM.

The process of returning by the bear device the stream information to the RM further includes:

returning, by the bearer layer device, an end message to the resource manager RM after returning the stream record to the resource manager RM; and determining, by the resource manager RM, an end of returning the stream record from the bearer layer device in accordance with the received end message.

The process of performing the synchronization process by the resource manager RM includes:

receiving, by the resource manager RM, the stream record returned from the bearer layer device, searching stream records stored in the resource manager RM for the stream record returned from the bearer layer device, and if the stream record returned from the bearer layer device is absent, instructing the bear device to delete the corresponding stream record; if the stream record returned from the bearer layer device is present, comparing the corresponding stream record stored in resource manager RM with the stream record returned from the bearer layer device, and if they are inconsistent, sending the corresponding stream record to the bearer layer device and instructing the bearer layer device to update the corresponding stream record; if they are consistent, performing no process.

The method further includes: performing, by the bearer layer device, a deletion or update process in response to the received instruction, and returning processing result information to the resource manager RM.

The method further includes: receiving, by the resource manager RM, the processing result information returned from the bearer layer device, and if it is determined from the processing result information that the bearer layer device has synchronized the corresponding stream record successfully, ends the synchronization process; if it is determined from the processing result information that the bearer layer device has not synchronized the corresponding stream record successfully, the request module continues sending new stream synchronization information.

Another embodiment of the invention further provides a system for synchronizing a stream between devices of a bearer control layer and a bearer layer, including a bearer layer device and a resource manager RM. The RM includes a request module and a determination module and the bear device includes a response module and a synchronization processing module;

the request module is adapted to send stream synchronization information to the bear device;

the response module is adapted to return a corresponding stream record to the RM in response to the stream synchronization information sent from the request module;

the determination module is adapted to compare a stream record returned from the response module with a stream record stored in the RM and to instruct the bear device to perform a stream synchronization process in accordance with a comparison result; and the synchronization processing module is adapted to perform the stream synchronization process on to-be-synchronized information in the bear device in accordance with the instruction from the determination module.

The following technical solutions of the system are optional.

When the stream synchronization information sent from the request module includes flag information of a stream to be synchronized, the response module returns a corresponding stream record to the RM in accordance with the received flag information of the stream; and when the stream synchronization information sent from the request module includes no flag information of a stream to be synchronized, the response module returns all stream records stored in the response module to the RM.

The response module returns an end message to the resource manager RM after returning the stream record to the RM, and the response module returns an end message to the resource manager RM upon determining that the flag information of the stream sent from the request module, is absent in the stream records stored in the bear device.

Upon determining that the stream record returned from the response module is absent in the stream records stored in the RM, the determination module instructs the synchronization processing module to delete the corresponding stream record; and upon determining that the stream record returned from the response module is present in the stream records stored in the RM, the determination module compares the returned stream record with the corresponding stream record stored in the RM, and if they are inconsistent, the determination module sends the corresponding stream record to the synchronization processing module and instructs the synchronization processing module to update the corresponding stream record; if they are consistent, the determination module performs no process.

The synchronization processing module returns processing result information to the RM at the end of the synchronization process, and if it is determined from the processing result information that the bearer layer device has synchronized the corresponding stream record successfully, the request module receives the processing result information returned from the bearer layer device and ends the synchronization process; if it is determined from the processing result information that the bearer layer device has not synchronized the corresponding stream record successfully, the request module continues with sending new stream synchronization information.

Another embodiment of the invention provides a resource manager RM including a request module and a determination module.

The request module is adapted to send stream synchronization information to a bear device.

The determination module is adapted to compare a stream record returned from the bear device with a stream record stored in the RM and to instruct the bear device to perform a stream synchronization process in accordance with a comparison result.

Another embodiment of the invention provides a bearer layer device including a response module and a synchronization processing module.

The response module is adapted to return a corresponding stream record to a resource manager RM in response to the stream synchronization information sent from the RM.

The synchronization processing module is adapted to perform a stream synchronization process on to-be-synchronized information in the bear device in accordance with an instruction from the resource manager RM.

As can be seen from the above technical solutions according to embodiments of the invention, the inventive bearer layer device returns corresponding information to the resource manager RM on the bearer control layer in response to stream synchronization information sent from the resource manager RM, and upon determining that information to be stream synchronized is present in the information returned from the bearer layer device, the resource manager RM compares the information to be stream synchronized with the corresponding stream record stored in the RM and performs a stream synchronization process on the to-be-synchronized information in the bearer layer device in accordance with a comparison result. With embodiments of the invention, it is not necessary for the RM to delete all streams on the bear device at an appropriate time so as to ensure no interruption of a service carried in any stream, and therefore the invention can ensure consistency between stream records of the RM and the bear device without any service interruption and without any temporal restriction on the time for stream synchronization operations. In embodiments of the invention, no additional interface on the RM and the bear device is required, and thus the stream synchronization operations are made simple and easy to be extended.

DETAILED DESCRIPTION OF THE EMBODIMENTS

The invention provides a method and system for synchronizing a stream between devices of a bearer control layer and a bearer layer. A general technical solution of the invention is that: a bearer layer device ER returns a corresponding stream record to a resource manager RM on a bearer control layer in response to stream synchronization information sent from the resource manager RM, and the resource manager RM compares a stream record stored in the RM with the stream record returned from the bearer device ER and performs a stream synchronization process on to-be-synchronized information in the bearer layer device ER in accordance with a comparison result.

The method for synchronizing a stream between devices of a bearer control layer and a bearer layer according to embodiments of the invention will be described below with reference to the drawings.

An object of an embodiment of the invention is to synchronize all stream table entries on the ER, in other words, to synchronize all stream records on the ER. A general technical solution of the embodiment is that: the RM sends a stream synchronization request carrying no stream flag; upon receiving such a stream synchronization request, the ER sends all stream records to the RM and sends a stream synchronization end message to the RM after sending the last stream record; and the RM analyzes each of the stream table entries sent from the ER to determine whether each of the stream table entries sent from the ER is consistent with the stream table entry stored in the RM and deletes a stream table entry redundant or adds a stream table entry absent on the RM upon determining inconsistency of the stream table entry. A specific implementation is as illustrated in FIG. 2.

Figure 1:
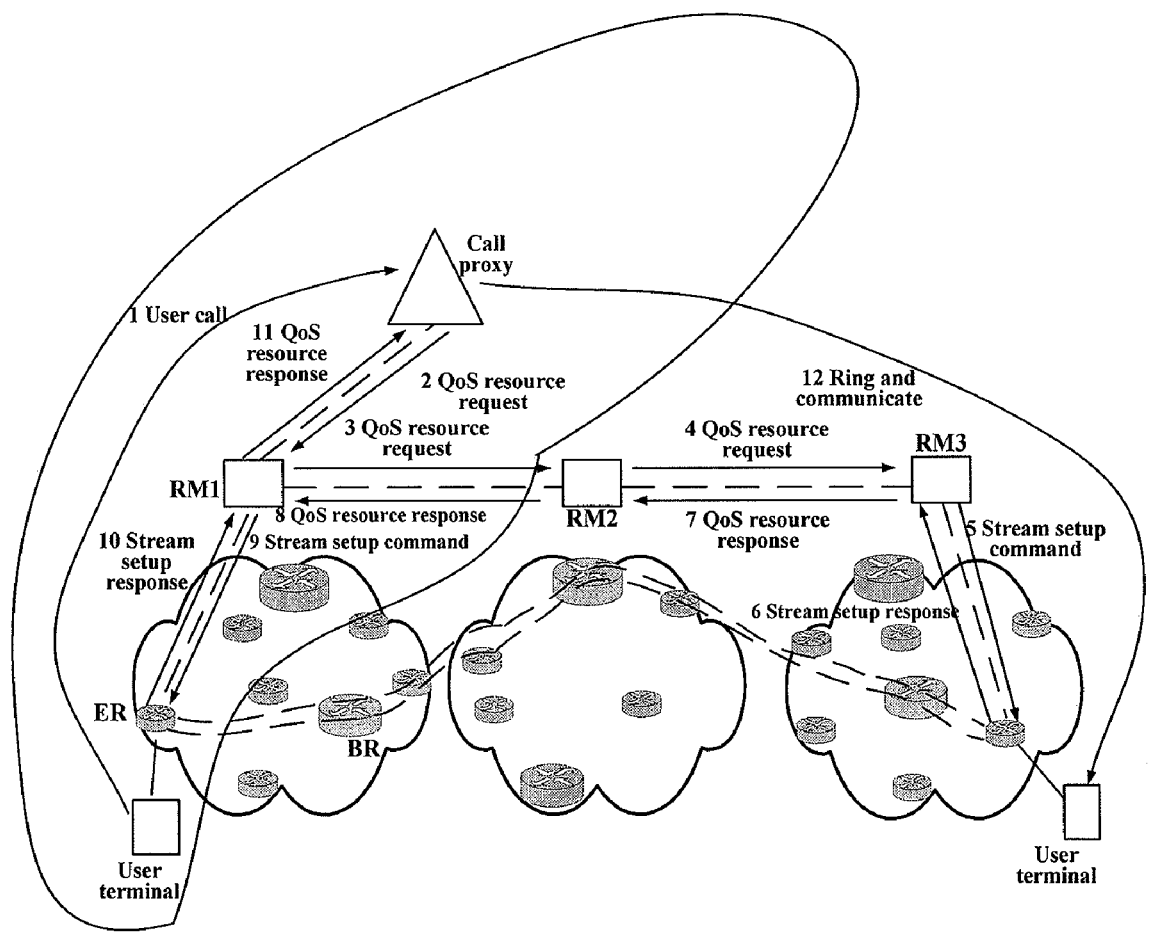
FIG. 1 is a schematic diagram of an application model of an IP telecom network.
Figure 2:
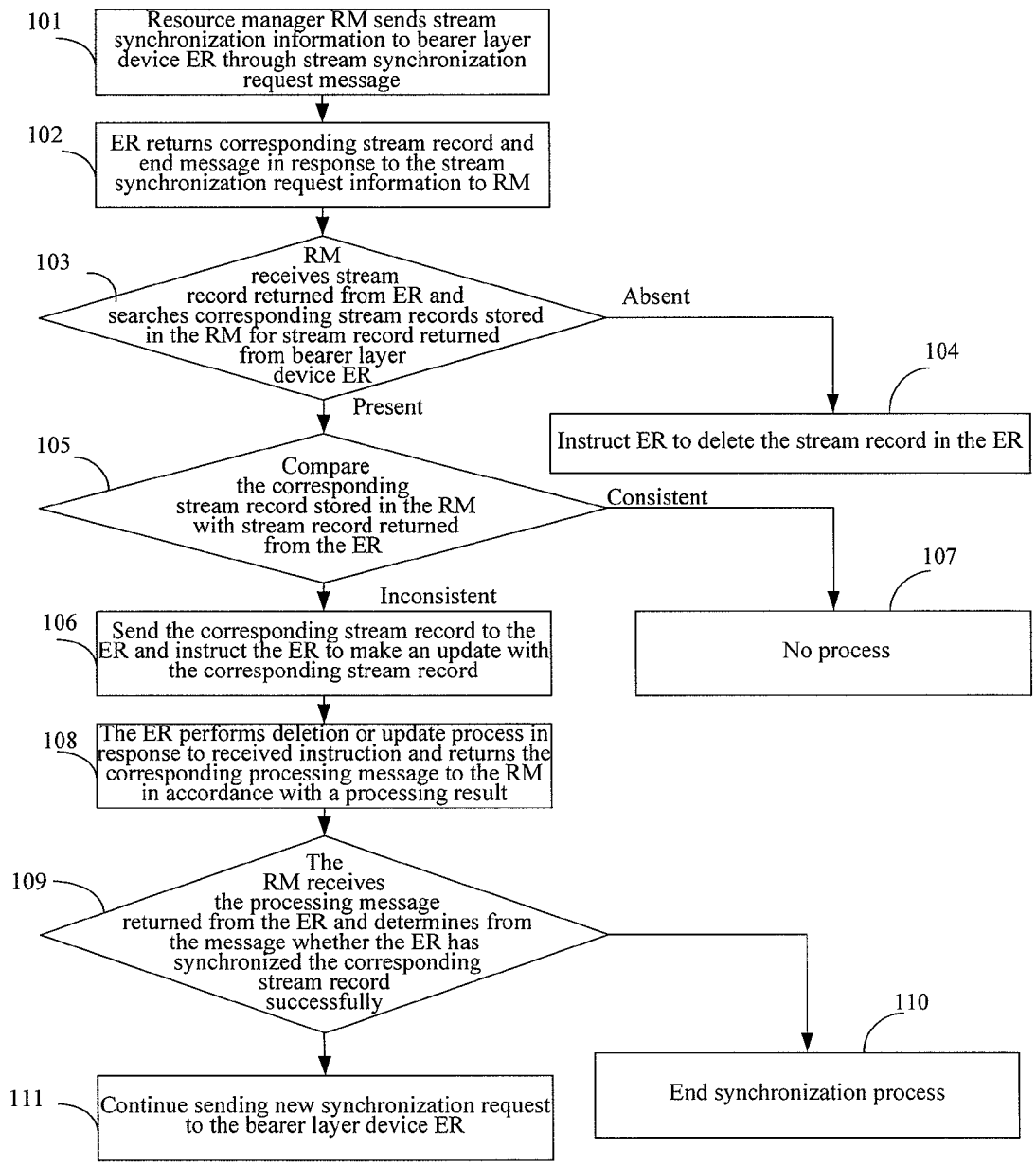
FIG. 2 is a flow chart of the method for synchronizing a stream between devices of a bearer control layer and a bearer layer according to embodiments of the invention.

Referring to FIG. 2, in step 101, a resource manager RM sends stream synchronization information in a stream synchronization request message to a bearer layer device ER.

In step 102, the bearer layer device ER returns to the resource manager RM a corresponding stream record and an end message in response to the stream synchronization information in the stream synchronization request.

In step 103, the resource manager RM receives the stream record returned from the bearer layer device ER and searches corresponding stream records stored in the RM for the stream record returned from the bearer layer device ER, and if the stream record is absent, the RM executes step 104 of instructing the ER to deletes the stream record in the ER; otherwise the flow goes to step 105.

In step 105, the RM compares a corresponding stream record stored in the RM with the stream record returned from the bearer layer device ER, and if they are inconsistent, the flow goes to step 106. In step 106, the RM sends the corresponding stream record to the bearer layer device ER and instructs the bearer layer device ER to delete or update the corresponding stream record and the flow goes to step 108; otherwise the flow goes to step 107, nothing is performed.

In step 108, the bearer layer device ER performs a deletion or update process on the corresponding stream record in response to the received instruction and returns a corresponding processing message to the resource manager RM in accordance with a processing result.

In step 108, the bearer layer device ER performs a deletion process on the corresponding stream record indicated in the received deletion instruction in response to the instruction and returns a successful deletion message to the resource manager RM upon successful deletion or an unsuccessful deletion message to the resource manager RM upon unsuccessful deletion.

In step 108, the bearer layer device ER updates the bearer layer device ER's own stream record with the received stream record in response to the received update instruction and returns a successful update message to the resource manager RM if the stream record is updated successfully or an unsuccessful update message to the resource manager RM if the stream record is updated with failure.

In step 109, the resource manager RM receives the processing message returned from the bearer layer device ER. When it is determined from the processing message that the bearer layer device ER has synchronized the corresponding stream record successfully, the flow goes to step 110 of and executes step 110 and the synchronization process ends; otherwise the flow goes to step 111, and the RM continues sending a new synchronization request to the bearer layer device ER.

Another embodiment of the invention is different from the first embodiment in that a stream synchronization request message specifies a stream table entry carrying a flag to be synchronized, the bearer layer device ER selects and sends a corresponding stream record carrying the same flag information to the resource manager RM for comparison, and if the stream record carrying the flag is present in the ER, the ER returns a stream presence response and a stream synchronization end message sequentially to the RM, and the present stream synchronization ends, or if no stream record carrying the flag is present in the ER, the ER returns a stream synchronization end message to the RM, and the present stream synchronization ends. The RM can determine to delete or preserve a table entry of the absent stream record in accordance with the synchronization result.

The present embodiment is more efficient in synchronization than the above embodiment. A specific implementation includes the following steps.

In step 201, the resource manager RM sends to the bearer layer device ER stream synchronization information in a stream synchronization request message carrying flag information of a stream to be synchronized.

In step 202, the ER checks whether a stream record carrying the flag information is present. If the stream record is absent, the flow goes to step 203 and an end message is returned to the resource manager RM; otherwise the flow goes to step 204 of selecting and returning the stream record carrying the flag information to the resource manager RM.

A subsequent procedure of executing steps 103 to 111 in the above embodiment is not detailed again.

The embodiments described above can be implemented on the basic of that the stream synchronization operations between the RM and the ER are executed in a synchronization procedure of the Common Open Policy Service (COPS) protocol based upon the use of the COPS protocol for communication between the RM and the ER. The following embodiments of the invention implement a synchronization mechanism in a policy dispatch and result response procedure of the COPS. The RM carries a stream synchronization start message in a policy dispatch message and the ER carries a stream synchronization result in a dispatch result response message.

Another embodiment of the invention includes the following steps:

In step 301, the resource manager RM sends to the bearer layer device ER a policy dispatch message carrying information to be stream synchronized.

In step 302, the bearer layer device ER returns a corresponding stream record to the resource manager RM in response to the stream synchronization information.

A subsequent procedure of executing steps 103 to 111 in the first embodiment will not be detailed again.

Still another embodiment of the invention includes the following steps.

In step 401, the resource manager RM sends to the bearer layer device ER a policy dispatch message carrying stream synchronization information to be performed, and the stream synchronization information carries flag information of a stream to be synchronized.

In step 402, the bearer layer device ER checks whether a stream record carrying the flag information is present and returns an end message to the resource manager RM if the stream record is absent; otherwise the ER selects and returns the stream record carrying the flag information to the resource manager RM.

A subsequent procedure of executing steps 103 to 111 in the first embodiment will not be detailed again.

The system for synchronizing a stream between devices of a bearer control layer and a bearer layer according to one embodiment of the invention includes a bearer layer device ER and a resource manager RM. The RM is provided with a request module and a judge module. The ER is provided with a response module and a synchronization processing module.

The request module is primarily adapted to send stream synchronization information to the ER. The request module may send the stream synchronization information possibly through a stream synchronization request message, a policy dispatch message, etc. The stream synchronization information indicates a need for stream synchronization and may or may not carry flag information of a stream to be synchronized. Detailed descriptions thereof can be as those in the above methods.

The response module is primarily adapted to return corresponding information to the RM in response to the stream synchronization information sent from the request module. The response module can return all stream information, i.e. stream records, to the RM according to the stream synchronization information, or return stream information, i.e. a stream record, carrying the flag information to the RM according to the flag information of the stream carried in the stream synchronization information to be synchronized. The response module returns an end message to the RM upon determining from a check that the flag information of the stream carried in the stream synchronization information to be synchronized is absent in the stream information stored in the response module. The response module can also return an end message along with the stream information so that the RM can know definitely an end of returning the stream information. Detailed descriptions thereof can be as those in the above methods.

The determination module is primarily adapted to receive the information returned from the response module, to determine whether information to be synchronized is present in the information returned from the response module, and if so, to compare the to-be-synchronized information in the returned information, i.e. the stream record, with corresponding stream information stored in the RM, and to instruct the ER to perform a stream synchronization process in accordance with a comparison result. If the comparison result is that the stream record in the returned information is absent in the stream information stored in the RM, the determination module instructs the ER to delete the corresponding stream record; and if the comparison result is that the stream information stored in the RM includes the stream record in the returned information, the determination module compares the stream record in the returned information with the corresponding stream record stored in the RM, and if they are inconsistent, the determination module sends the corresponding stream record to the bearer layer device ER and instructs the bearer layer device ER to update the corresponding stream record, or if they are consistent, the determination module performs further process. Detailed descriptions thereof can be as those in the above methods.

The synchronization processing module is primarily adapted to perform a synchronization process on the to-be-synchronized information in the ER in response to the instruction from the determination module and to return a corresponding processing message to the RM in accordance with a processing result. The synchronization process includes a process of deleting or updating a stream record. For example, upon receiving a deletion instruction, the synchronization processing module performs a deletion process on the corresponding stream record indicated in the instruction and returns a successful deletion message to the RM upon successful deletion or returns an unsuccessful deletion message to the RM upon unsuccessful deletion. In another example, upon receiving a deletion instruction, the synchronization processing module updates the stream record stored in the ER with the received stream record and returns a successful update message to the RM upon successful update or returns an unsuccessful update message to the RM upon unsuccessful update. Detailed descriptions thereof can be as those in the above methods.

After the RM receives the unsuccessful update or deletion message returned from the ER, the request module continues sending new stream synchronization information to the ER to repeat the stream synchronization procedure. Detailed descriptions thereof can be as those in the above methods.

As can be seen from the above technical solutions according to the invention, the inventive bearer layer device ER returns corresponding information to the resource manager RM on the bearer control layer in response to stream synchronization information sent from the resource manager RM, and upon determining that information to be stream synchronized is present in the information returned from the bearer layer device ER, the resource manager RM compares the information to be stream synchronized with corresponding information stored in the RM and performs a stream synchronization process on the to-be-synchronized information in the bearer layer device ER in accordance with a comparison result. With the invention, it is not necessary for the RM to delete all streams on the ER at an appropriate time so as to ensure no interruption of a service carried in any stream, and therefore the invention can ensure consistency between stream records of the RM and the ER without any service interruption and without any temporal restriction on the time for stream synchronization operations. In the invention, no additional interface on the RM and the ER is required, and thus the stream synchronization operations are made simple and easy to be extended.

The foregoing descriptions are merely illustrative of the exemplary embodiments of the invention and the scope of the invention will not be limited thereto. Any variation or alternative occurring to those skilled in the art without departing from the spirit of the invention shall fall into the scope of the invention as defined in the appended claims.

The invention claimed is:

1. A method for synchronizing stream records between devices of a bearer control layer and a bearer layer, comprising:

returning, by a bearer layer device, a stream record corresponding to a stream synchronization request sent from a resource manager (RM), to the RM on the bearer control layer in response to the stream synchronization request sent from the RM; and comparing, by the RM, a stream record stored in the RM with the stream record returned from the bearer layer device; and performing, by the RM, a stream synchronization process on to-be-synchronized information in the bearer layer device in accordance with a comparison result;

wherein the process of performing the stream synchronization process by the RM comprises:

receiving, by the RM, the stream record corresponding to the stream synchronization request sent from the RM, returned from the bearer layer device, searching stream records stored in the RM for the stream record returned from the bearer layer device, and if the stream record returned from the bearer layer device is absent in the stream records stored in the RM, instructing the bearer layer device to delete the stream record absent in the stream records stored in the RM and returned from the bearer layer device;

if the stream record returned from the bearer layer device is present in the stream records stored in the RM, comparing the stream record stored in the RM with the stream record returned from the bearer layer device, and if the stream record stored in the RM and the stream record returned from the bearer layer device are inconsistent, sending the inconsistent stream record stored in the RM to the bearer layer device and instructing the bearer layer device to update the inconsistent stream record stored in the bearer layer device.

2. The method according to claim 1, wherein the process of returning by the bearer layer device the corresponding stream record to the RM comprises:

sending, by the RM, the stream synchronization request in a stream synchronization request message to the bearer layer device; and returning, by the bearer layer device, the stream record corresponding to the stream synchronization request sent from the RM, to the RM in response to the stream synchronization request.

3. The method according to claim 1, wherein the process of returning by the bearer layer device the corresponding stream record to the RM comprises:

sending, by the RM, to the bearer layer device the stream synchronization request in a stream synchronization request message carrying flag information of a stream table entry to be synchronized; and checking, by the bearer layer device, to determine whether a stream record carrying the flag information is present, and if there is no stream record carrying the flag information, returning an end message to the RM; if the stream record carrying the flag information is present, selecting and returning the stream record carrying the flag information to the RM.

4. The method according to claim 1, wherein the process of returning by the bearer layer device the stream record corresponding to the stream synchronization request sent from the RM, to the RM comprises:

sending, by the RM, to the bearer layer device a policy dispatch message carrying the to-be-synchronized information; and returning, by the bearer layer device, the stream record corresponding to the to-be-synchronized information, to the RM in response to the to-be-synchronized information.

5. The method according to claim 1, wherein the process of returning by the bearer layer device the stream record corresponding to the stream synchronization request sent from the RM, to the RM comprises:

sending, by the RM, to the bearer layer device a policy dispatch message carrying the to-be-synchronized information, the to-be-synchronized information carrying flag information of a stream table entry to be synchronized; and checking, by the bearer layer device, to determine whether a stream record carrying the flag information is present, and if there is no stream record carrying the flag information, returning an end message to the RM; if the stream record carrying the flag information is present, selecting and returning the stream record carrying the flag information to the RM.

6. The method according to claim 2, wherein the process of returning by the bearer layer device the stream record corresponding to the stream synchronization request sent from the RM, to the RM further comprises:

returning, by the bearer layer device, an end message to the RM after returning the stream record corresponding to the stream synchronization request sent from the RM, to the RM; and determining, by the RM, an end of returning the stream record corresponding to the stream synchronization request sent from the RM, from the bearer layer device in accordance with the received end message.

7. The method according to claim 1, further comprising: performing, by the bearer layer device, a deletion or update process in response to the received instruction, and returning processing result information to the RM.

8. The method according to claim 7, further comprising: receiving, by the RM, the processing result information returned from the bearer layer device, if it is determined from the processing result information that the bearer layer device has synchronized the stream record absent in the stream record in the RM or the stream record inconsistent with the stream record in the RM successfully, ending the synchronization process; if it is determined from the processing result information that the bearer layer device has not synchronized stream record absent in the stream record in the RM or the stream record inconsistent with the stream record in the RM successfully, continuing with sending a new stream synchronization request to the bearer layer device.

9. A system for synchronizing stream records between devices of a bearer control layer and a bearer layer, comprising a bearer layer device and a resource manager (RM), wherein the RM comprises a request module and a determination module and the bearer layer device comprises a response module and a synchronization processing module; wherein the request module is configured to send a stream synchronization request to the bearer layer device;

the response module is configured to return a stream record corresponding to the stream synchronization request sent from the request module, to the RM in response to the stream synchronization request sent from the request module;

the determination module is configured to compare the stream record returned from the response module with a stream record stored in the RM and to instruct the bearer layer device to perform a stream synchronization process on to-be-synchronized information in accordance with a comparison result; and the synchronization processing module is configured to perform the stream synchronization process on the to-be-synchronized information in the bearer layer device in accordance with the instruction from the determination module;

wherein when the stream synchronization request sent from the request module comprises flag information of a to-be-synchronized stream record, the response module returns a stream record corresponding to the flag information to the RM in accordance with the received flag information of the stream record; and when the stream synchronization request sent from the request module comprises no flag information of the to-be-synchronized stream record, the response module returns all stream records stored in the response module to the RM;

wherein upon determining that the stream record returned from the response module is absent in the stream records stored in the RM, the determination module instructs the synchronization processing module to delete the stream record absent in the stream records stored in the RM; and upon determining that the stream record returned from the response module is present in the stream records stored in the RM, the determination module compares the stream record returned from the response module with the stream record stored in the RM, and if the stream record stored in the RM and the corresponding stream record returned from the bearer layer device are inconsistent, the determination module sends the inconsistent stream record to the synchronization processing module and instructs the synchronization processing module to update the stream record corresponding to the inconsistent stream record.

10. The system according to claim 9, wherein the response module returns an end message to the RM after returning the stream record corresponding to the stream synchronization request sent from the request module, to the RM, and the response module returns the end message to the RM upon determining that the flag information of the stream record sent from the request module is absent in the stream records stored in the bearer layer device.

11. The system according to claim 9, wherein the synchronization processing module returns processing result information to the RM at the end of the synchronization process, and the request module receives the processing result information returned from the bearer layer device and if it is determined from the processing result information that the bearer layer device has synchronized the stream record absent in the stream record in the RM or the stream record inconsistent with the stream record in the RM successfully, ends the synchronization process; if it is determined from the processing result information that the bearer layer device has not synchronized the stream record absent in the stream record in the RM or the stream record inconsistent with the stream record in the RM successfully, the request module continues with sending a new stream synchronization request.

* * * * *